United States Patent [19]
Deshpande

[11] 3,971,707
[45] July 27, 1976

[54] OXIDATION OF PHOSPHORUS IN AQUEOUS MEDIUM

[75] Inventor: Arun K. Deshpande, St. John's, Canada

[73] Assignee: Erco Industries Limited, Islington, Canada

[22] Filed: July 25, 1973

[21] Appl. No.: 382,491

[52] U.S. Cl. ................................. 204/149; 204/90; 204/130
[51] Int. Cl. ........................... C02b 1/82; C02c 5/12
[58] Field of Search ...................... 204/90, 130, 149

[56] References Cited
UNITED STATES PATENTS

| | | | |
|---|---|---|---|
| 967,996 | 8/1910 | Summers | 204/90 |
| 3,035,992 | 5/1962 | Hougen | 204/149 |
| 3,109,788 | 11/1963 | Miller et al. | 204/90 X |
| 3,573,181 | 3/1971 | Cochran | 204/90 X |

Primary Examiner—John H. Mack
Assistant Examiner—A. C. Prescott
Attorney, Agent, or Firm—Sim & McBurney

[57] ABSTRACT

Elemental phosphorus in electrothermal phosphorus plant effluents is oxidized either by anodically produced atomic oxygen or by an anodically produced mixture of atomic chlorine and atomic oxygen. The elemental phosphorus content of the effluents may be lowered by use of this process from about 5 to 10 ppb to an undetectable level, i.e., below about 0.1 ppb.

15 Claims, 1 Drawing Figure

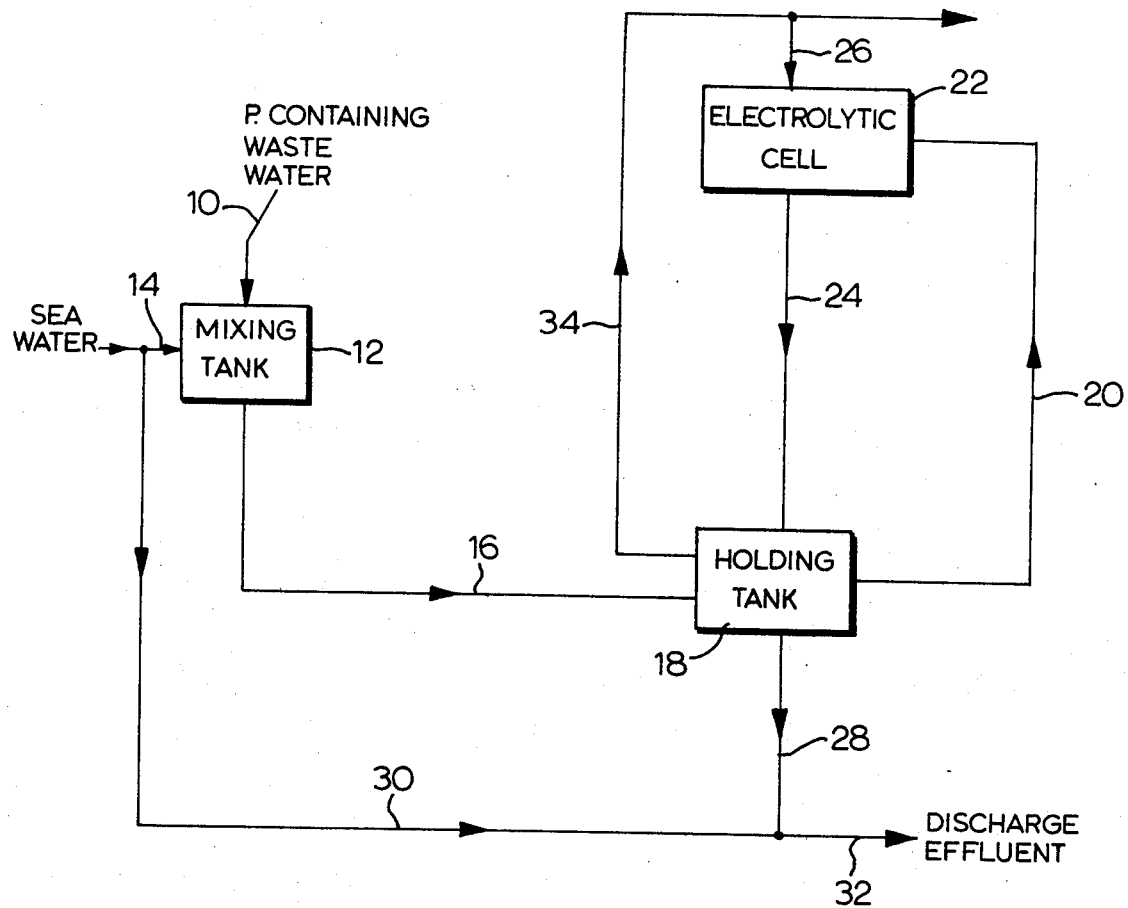

OXIDATION OF PHOSPHORUS IN AQUEOUS MEDIUM

FIELD OF INVENTION

The present invention relates to the oxidation of elemental phosphorus in aqueous media.

BACKGROUND TO THE INVENTION

Elemental phosphorus may be formed by electric reduction of phosphate rock. In a particular known procedure, ground and pelletized phosphate rock ore is mixed with coke and silica, and the mixture is electrically smelted. The phosphorus is driven off in gaseous form, condensed and recovered as a liquid. The liquid phosphorus is collected under water since it is combustible when exposed to air.

Liquid waste effluents are provided by this procedure including condensor process water, called "phossy" water. The phossy water contains small quantities of elemental phosphorus, and, after smelting together with other aqueous effluents in a first pond, the resulting aqueous liquid contains from about 3 to 10 ppm. After further lowering of the elemental phosphorus content in scrubbing operations the aqueous liquid is treated with lime to a pH of about 5.5 in a second pond. The resulting pond effluent, known as No. 2 pond water, contains from about 5 to 10 ppb of elemental phosphorus.

Phosphorus has been found to be toxic to aquatic life, especially marine fish, and hence, from an environmental protection point of view, the discharge of the phossy water to aquatic life-bearing water bodies should be avoided.

Due to the colloidal nature of the suspension of the elemental phosphorus in the No. 2 pond water, it is extremely difficult to separate out the solid elemental phosphorus by physical methods, such as filtration and centrifuging. In addition, simple dilution of this waste effluent is ineffective since the elemental phosphorus tends to accumulate at the discharge point of the waste water rather than being dispersed.

The present invention makes it possible to decrease the elemental phosphorus content of aqueous media below an undetectable level (i.e., less than 0.1 ppb), and hence allowing the safe discharge of the treated aqueous medium to water bodies.

SUMMARY OF INVENTION

In accordance with the present invention, elemental phosphorus in an aqueous medium is subjected to electrolytic oxidation. The aqueous medium preferably is an elemental phosphorus containing medium obtained from an electrothermal phosphorus plant especially No. 2 pond water, although other elemental phosphorus-containing aqueous media may be treated by the process of the invention.

In one aspect of the present invention, the aqueous medium containing elemental phosphorus is subjected to electrolysis in the substantial absence of electrolytes capable of producing atomic chlorine electrolytically at a pH of about 1 to 10 to oxidize the elemental phosphorus by anodically-produced atomic oxygen.

In another aspect of the invention, an aqueous medium containing elemental phosphorus is subjected to electrolysis in the presence of electrolytes capable of producing atomic chlorine electrolytically. The elemental phosphorus is oxidized by the anodically-produced mixture of atomic chlorine and atomic oxygen.

In accordance with a preferred embodiment of this second aspect of the present invention the process is carried out under certain controlled conditions, as specified in more detail below, to oxidize the elemental phosphorus efficiently while minimizing side effects.

It has been found that by employing the electrolysis method of the present invention, the elemental phosphorus values of the aqueous medium may be decreased to a final concentration which is not detectable by known methods of elemental phosphorus determination, including gas chromatography methods using a flame-photometric detector having a sensitivity of 1 × $10^{-10}$ parts per ml of sample (i.e., less than 0.1 ppb).

Other oxidation processes, such as aeration, oxygenation and the use of chemical oxidants, such as sodium chlorate, sodium chlorite and sodium hypochlorite, have not been found to decrease elemental phosphorus contained in aqueous media to the undetectable levels achieved by the process of the present invention.

BRIEF DESCRIPTION OF DRAWING

The sole FIGURE of the drawing illustrates a schematic flow sheet of one embodiment of the second aspect of this invention.

DESCRIPTION OF PREFERRED EMBODIMENTS

Referring to the drawing, there is illustrated schematically a preferred manner of conducting the second aspect of this invention. Elemental phosphorus containing waste water, typically No. 2 pond water, having an elemental phosphorus content of typically about 5 to 10 ppb, although waste water containing up to about 50 ppb of elemental phosphorus has been treated, is fed by line 10 to a mixing tank 12. In the mixing tank 12, the waste water is mixed with sea water fed by line 14. Any other source of brine solution may be used, but it is convenient to use sea water in coastal regions.

The proportions of mixing of the waste water and the sea water are not critical although higher rates of oxidation are observed with increasing proportions of sea water, and typically about 1:1 mixture of the components corresponding to a sodium chloride concentration of about ¾ to 1% is employed. The mixture is fed by line 16 to a holding tank 18. The holding tank 18, typically a multi-baffled tank, has a large capacity as compared to the volume of liquid fed by line 16, and provides a feed line 20 of electrolyte, typically having a pH of about 3 to 6.5 for an electrolytic cell 22 wherein the electrolyte is subjected to electrolysis.

The holding tank 18 may be any convenient multi-baffled type, including a plurality of upright baffles dividing the tank 18 into at least two, preferably a plurality of compartments or zones. The baffles have openings therein allowing passage of liquid from one zone to another through the tank.

The quantity of electrolyte in feed line 20 typically is a portion only of the quantity of liquid in the tank 18, and hence at any given time there is a substantial pool of liquid present in the holding tank 18.

The pool of liquid in the holding tank 18 acts as a buffer to smooth out wide variations in the elemental phosphorus content of the waste water in line 10, typically between 1 and 50 ppb, so that the liquid feed to the cell 22 in line 20 contains a substantially constant elemental phosphorus content which is about 1 to 3 ppb.

The mixture fed to the tank 18 by line 16 is recycled through the cell 22 a number of times before discharge, as is described in more detail below, and the tank 18 serves to hold the liquid for recycle.

Any convenient cell construction may be employed, typically a diaphragm, monopolar or multipolar cell.

Preferably, a multipolar cell structure is employed containing a plurality of closely spaced electrodes between which the electrolyte flows upwardly, the liquid product being separated from gaseous products in a gas-liquid separator associated with the cell 22.

Any convenient electrode material may be employed in the cell 22, typically graphite. As the electrolyte passes over the electrode faces, it is subjected to electrolysis, forming a mixture of atomic chlorine and atomic oxygen at the anodes which acts as oxidizing agent on the element phosphorus.

The current density on the electrodes may vary widely, typically in the range about 0.0125 amps/sq.in. to about 0.187 amps/sq.in., although values outside this range may be employed, typically up to about 0.25 to 0.33 amps/sq.in. The higher values generally are avoided, however, in order to minimize side reactions forming chlorine gas and phosphorus-chlorine compounds. Typically, a current density of about 0.125 amps/sq.in. is employed.

The electrode gap within the cell 22 may be varied widely. However, the power requirement of the cell 22 increases with increasing electrode gap and, generally, therefore, the electrode gap is maintained about ¼ to ½ inch.

The electrolysis temperature is generally the ambient temperature of the electrolyte in line 20, typically about 20° to 25°C and little rise in temperature occurs in a multipolar cell. Temperatures above about 40°C are avoided when graphite electrodes are used in the cell due to rapid erosion thereof above 40°C.

The electrolyzed solution is returned from the cell 22 to the holding tank 18 by line 24. Any gaseous products formed in the cell, mainly in the form of hydrogen with small amounts of chlorine, are vented by line 26 and may be diluted with air prior to discharge to the atmosphere.

Some chlorine gas may escape from the solution in the holding tank 18. This chlorine is vented by lines 34 and 26 to the atmosphere, after dilution, if required.

An effluent which is substantially elemental phosphorus free discharges from the holding tank 18 by line 28. The feed of the electrolyzed solution by line 24 generally is to one compartment of a multi-compartment reaction tank 18 from which the elemental phosphorus-free effluent discharges by line 28. The feed line 16 in this case discharges into a second compartment adjacent the one compartment.

The quantity of liquid removed by line 28 preferably is substantially the same as the quantity fed to the holding tank 18 by line 16. Therefore, the liquid returned by line 24 to the one compartment of the holding tank 18 overflows the compartment into the remainder of the pool of liquid in the holding tank 18.

The quantity of liquid cycled from the holding tank 18 through the cell 22 is generally in excess of the quantity of liquid fed to the holding tank 18 by line 16 and is but a fraction of the total liquid in the tank 18. The ratio of feed of cycled liquid in line 20 to feed of liquid in line 16 may vary from about 2:1 up to about 6:1, with a typical ratio being about 4:1. In addition, the ratio of quantity of liquid cycled in line 20 to the quantity of liquid present in the tank 18 may vary generally up to about 10:1, typically about 5:1.

The mixture of sea water and elemental phosphorus-containing waste water, in this way, is periodically recycled between the reaction tank 18 and the electrolytic cell 22 until discharged by line 28, with a substantial body of liquid being maintained in the holding tank 18.

The elemental phosphorus contained in the feed liquor in line 16 is oxidized by the mixture of anodically produced atomic chlorine and atomic oxygen in the cell 22 to phosphorus pentoxide which is hydrolyzed to soluble phosphorus-oxide materials, which are non-toxic to aquatic life. The recycling is carried out to ensure substantially complete oxidation of the elemental phosphorus to non-toxic harmless materials even in the event of a high level of elemental phosphorus in the feed mixture in line 16.

The residence time of the liquid with the cell 22 and the holding tank 18 may vary widely depending on the individual flow rates chosen. Generally, however, the residence time of the liquid in the holding tank 18 is considerably in excess of that in the cell, in order to minimize side reactions of the electrolysis while still satisfactorily oxidizing the elemental phosphorus by the mixture of atomic chlorine and atomic oxygen. Typically, an average residence time of liquor in the holding tank 18 of about 30 to about 60 minutes preferably about 40 minutes, may be used, with a residence time in the cell 22 of about 5 to 15 seconds, typically about 12 seconds.

The liquid effluent from the holding tank 18 in line 28 has been found to have no detectable elemental phosphorus content over long periods of operation with widely varying levels of elemental phosphorus in the waste water in line 10.

There may be present in the effluent in line 28 small quantities of dissolved chlorine, typically about 1 to 5 ppm. In addition, since a slightly acid pH, typically about pH 6.0 to 6.5, usually is used for the electrolyte in line 20, the effluent in line 28 usually has an acid pH, typically about pH 5.8 to 6.2.

Therefore, while it is possible by the process of the present invention to overcome the major problem of the presence of toxic elemental phosphorus in waste water, the presence of the dissolved chlorine in the effluent in line 28 and its acid pH may represent alternative hazards to aquatic life. Therefore, prior to discharge of the effluent in line 28 it is preferred to mix the same with sea water fed by line 30. The quantity of sea water employed in this dilution usually should be sufficient to provide an effluent for discharge in line 32 having a pH approximately that of the sea water to which the effluent is to be discharged and a dissolved chlorine concentration less than 0.05 ppm. Typically, the effluent in line 28 is mixed with from 50 to 100 volumes of sea water fed by line 30 to provide the discharge effluent in line 32.

Where the installation is remote from a coastal region, the effluent in line 28 may be mixed with a considerable volume of water from the body to which the discharge effluent ultimately is to be fed in order to provide the dilution discussed above.

As mentioned above, another aspect of the present invention involves oxidation of the elemental phosphorus with anodically produced atomic oxygen. In this aspect, the addition of sea water, brine or other source of sodium chloride is avoided and therefore atomic oxygen formed from the water in which the elemental phosphorus is suspended in the sole oxidizing agent.

The electrolytic oxidation may take place over wide range of pH, such as pH 1 to 10, although pH's above about 10 are avoided since phosphine tends to be formed, providing an alternative pollution problem. Since waste waters containing elemental phosphorus, typically from electrothermal phosphorus-generating plants especially No. 2 pond water, usually have slightly acid pH's typically around 5 to 6, it is preferred to conduct the electrolytic oxidation at the natural pH of the waste water being treated.

The form of the cell which is employed in this aspect of the invention is not critical and a diaphragm, monopolar or multipolar cell may be used. Any convenient electrode material may be used, typically graphite.

If a diaphragm cell is used, after electrolysis in the anode compartment to oxidize the elemental phosphorus present typically mixing a residence time of from about 30 to about 50 minutes, the cell liquor may be passed into the cathode compartment to neutralize any acidity of the anolyte with sodium hydroxide generated in the cathode compartment. In this way, the pH of the water discharged from the cell and ultimately to waste may be controlled to that of the environment into which it is to be discharged.

This latter procedure also may be used in the aspect of the invention where the oxidation takes place using a mixture of atomic chlorine and atomic oxygen.

Other dissolved salts may be present in the waste water, whether inherently present in the waste water or added with the sea water when this aspect is employed, and these materials, typically calcium or magnesium salts, may be deposited on the cathode during electrolysis and impair the electrolysis operation. If the build-up of deposits is allowed to continue, bridging of the electrodes may occur. This problem may be overcome by periodically reversing the polarity of the electrodes.

EXAMPLES

The invention is illustrated further by the following Examples

EXAMPLE 1

An operation was set up as illustrated in the FIGURE employing the following parameters:

| Cell 22 : | (i) | 48 unit cells using graphite electrodes 40" × 35" × ⅝" thick spaced ½" appart |
| --- | --- | --- |
| | (ii) | Current density 0.125 amps/sq.in. |
| Holding tank 18 : | | 6000 gallons capacity with 5 compartments in series. |

No. 2 pond water having a pH of about 5.5 and containing about 5 ppb of elemental phosphorus was fed by line 10 at a rate of 50 gallons per minute to the mixing tank 12 and sea water having a pH of about 8.2 was fed by line 14 at a rate of 50 gallons per minute to the mixing tank 12.

The mixture was fed by line 16 at a rate of 100 gallons per minute to the second compartment of the holding tank 18 which contained about 3000 gallons of liquid. Electrolyte for the cell 22 having a pH of about 6.0 to 6.5 and a temperature of about 22°C was passed by line 20 at a rate of 600 gallons per minute. After a residence time of about 12 seconds in the cell 22, the electrolyzed solution was recycled by line 24 to the first compartment of the holding tank 18. The liquids had an average residence time of 30 minutes in the holding tank 18. Effluent was discharged from the first compartment by line 28 at a rate of 100 gallons per minute and analysis of this effluent indicated a concentration of elemental phosphorus less than 0.1 ppb, i.e., undetectable, a chlorine concentration of about 5.0 ppm and a pH of about 6.0.

The effluent in line 28 was mixed with 6800 gallons per minute of sea water fed by line 30 to provide discharge effluent in line 32 at a rate of 6900 gallons per minute having a chlorine concentration of 0.072 ppm and a pH of about 8.2.

EXAMPLE 2

A diaphragm cell consisting of a cylindrical plastic tank of approximately 2.6 litres capacity was set up. A 1/16 inch thick PVC sheet was used to divide the tank into two sections, one (the anode compartment) having a volume of 2000 mls and containing a graphite electrode and a motorized stirrer, and the other (the cathode compartment) having a volume of 600 mls and containing a graphite electrode. The graphite electrodes were 2 × 4 × ½ inch and were located at the lower end of the tank with their faces parallel and separated by a ¼ inch gap. A ½ inch hole was cut in the diaphragm approximately at the center of the electrodes to allow the ions to flow across.

An aqueous medium consisting of process water from an electrothermal phosphorus producing process containing approximately 0.8 to 1 ppb of elemental phosphorus was fed into the cell at a pH of 3.2 to 3.3.

The medium was subjected to electrolysis at a voltage of 44 volts and a current density of 0.125 amps/sq.in. for a residence time of about 30 minutes in the anode compartment. At the end of the reaction time, there was recovered a solution containing no detectable elemental phosphorus and a pH of about 3.5 to 3.7.

Modifications are possible within the scope of the invention.

What I claim is:

1. A process for decreasing elemental phosphorus levels in an aqueous medium which comprises subjecting said aqueous medium containing elemental phosphorus to electrolysis in the substantial absence of electrolytes capable of producing atomic chlorine electrolytically at a pH of about 1 to about 10, whereby said elemental phosphorus is oxidized by anodically produced atomic oxygen.

2. The process of claim 1 including feeding said aqueous medium having a pH of about 3.0 to 6.5 to an electrolytic cell containing graphite electrodes, subjecting said medium to electrolysis within said cell at a current density of from about 0.0125 to about 0.25 amps/sq.in. between electrodes spaced apart from ¼ to ½ inch, and recovering from said cell an aqueous stream having a reduced elemental phosphorus content.

3. The process of claim 2 wherein said aqueous medium comprises process water from an electrothermal phosphorus-producing plant having an elemental phosphorus content of about 5 to about 10 ppb and a pH of about 6 to 6.5, and said process water is subjected to electrolysis within said cell until the elemental phosphorus level of said water is reduced below 0.1 ppb.

4. A process for decreasing the elemental phosphorus content of an aqueous medium which comprises:

mixing said aqueous medium with an aqueous solution of sodium chloride to provide a mixture having a pH of about 3 to about 6.5;

feeding said mixture to an electrolytic cell containing electrodes spaced-apart from ¼ to ½ inch, subjecting said mixture to electrolysis within the cell at a current density of about 0.0125 to about 0.187 amps/sq. inch to form a mixture of atomic chlorine and atomic oxygen, oxidizing said elemental phosphorus with said mixture of atomic chlorine and atomic oxygen in said cell, and recovering an aqueous medium having a decreased elemental-phosphorus content.

5. The process of claim 4 wherein said aqueous medium is process water from an electrothermal phosphorus-producing plant.

6. The process of claim 5 wherein said process water has elemental phosphorus content of about 5 to 10 ppb.

7. The process of claim 5 wherein said aqueous solution of sodium chloride is sea-water.

8. The process of claim 7 wherein said sea water is mixed with said process water in the ratio 1:1.

9. A continuous process for decreasing the elemental phosphorus content of a process water resulting from an electrothermal phosphorus-produced plant from up to 50 ppb to less than 0.1 ppb which comprises:

establishing an electrolytic cell having a plurality of plate-like graphite electrodes spaced apart about ¼ to ½ inch to define flow paths for electrolyte through said cell, establishing a holding zone having a first zone and a second zone therein in fluid flow communication with each other, continuously forming a mixture of an aqueous sodium chloride solution and said process water, continuously feeding said mixture to a pool of aqueous material in the second zone of said holding zone having a substantially constant volume, continuously forwarding aqueous material having a pH of about 3 to about 6.5 from the second zone of said holding zone to said cell and continuously electrolyzing aqueous material as it passes through said cell to form a mixture of atomic chlorine and atomic oxygen and thereby continuously oxidize elemental phosphorus with said mixture of atomic chlorine and atomic oxygen in said cell, continuously feeding cell effluent to the first zone of said holding zone, continuously removing a product stream from the first zone of said holding zone at substantially the same rate as the rate of feeding of said mixture to said holding zone, said product stream having an elemental phosphorus content less than 0.1 ppb and a chlorine content of about 1 to 5 ppm, and continuously diluting said product stream with aqueous sodium chloride solution to provide an effluent stream of chlorine content less than about 0.05 ppm, the rate of flow of aqueous material from said holding zone through said cell being in excess of the rate of flow of said mixture to said holding zone, whereby said cell effluent fed to the first zone of said holding zone continuously overflows into the second zone of said holding zone.

10. The process of claim 9 wherein the rate of flow of liquid from said holding zone through said cell is from 2 to 6 times the rate of flow of said mixture to said holding zone.

11. The process of claim 9 wherein the volume of liquid in said pool is from 5 to 10 times in excess of the quantity of liquid from the holding zone through cell in unit time.

12. The process of claim 9 wherein said aqueous material is resident from 5 to 15 seconds in said cell.

13. The process of claim 9 wherein said sodium chloride solution is sea water and said mixture of process water and sodium chloride solution is in an approximately 1:1 ratio.

14. A process for decreasing elemental phosphorus levels in an aqueous medium which comprises mixing said aqueous medium with an aqueous solution of sodium chloride, electrolyzing the resulting mixture at a pH of about 1 to about 10 to form a mixture of atomic chlorine and atomic oxygen, and oxidizing said elemental phosphorus with said mixture of atomic chlorine and atomic oxygen.

15. The process of claim 14 wherein said aqueous solution of sodium chloride is sea water.

* * * * *